US00RE39414E

(19) United States
(12) Reissued Patent
Poll

(10) Patent Number: US RE39,414 E
(45) Date of Reissued Patent: Nov. 28, 2006

(54) OUTBOARD MOTOR SUPPORT DEVICE

(76) Inventor: Steven J. Poll, 54 S. Butler, Fond Du Lac, WI (US) 54935

(21) Appl. No.: 09/803,453

(22) Filed: Mar. 8, 2001

Related U.S. Patent Documents

Reissue of:
(64) Patent No.: 5,888,109
Issued: Mar. 30, 1999
Appl. No.: 08/851,299
Filed: May 5, 1997

(51) Int. Cl.
*B63H 5/125* (2006.01)

(52) U.S. Cl. ..... 440/55; 440/900; 248/640
(58) Field of Classification Search ..... 440/53, 440/54, 55, 56, 57, 900; 248/640, 641, 642
See application file for complete search history.

(56) References Cited

U.S. PATENT DOCUMENTS 1,172,176 A * 2/1916 Stanley ..... 440/55
3,693,576 A * 9/1972 Driscoll ..... 440/55
4,650,427 A * 3/1987 Huchinson ..... 440/55
4,828,186 A * 5/1989 Weiss ..... 440/55
4,842,239 A * 6/1989 Kinsey et al. ..... 440/55

* cited by examiner

*Primary Examiner*—Stephen Avila
(74) *Attorney, Agent, or Firm*—Kinney & Lange, P.A.

(57) ABSTRACT

An outboard motor support device for securing an outboard motor to a transom of a boat which comprises a tie down bracket, a support, and a tie down strap. The tie down bracket being secured to the transom of the boat while the support is rotatably mounted to the motor such that when the motor is in an up position, the support can rotate about its mounting point to contact and support the motor. The tie down strap then passes behind the motor and is secured to the tie down bracket. This secures the motor between the support and the tie down strap providing additional support.

40 Claims, 4 Drawing Sheets

24
36
34
86
10
84
72
68
26
52
38
82
58
66
40
64
54
60
62
80
70
18
76
78
56
76
50

OUTBOARD MOTOR SUPPORT DEVICE

Matter enclosed in heavy brackets [ ] appears in the original patent but forms no part of this reissue specification; matter printed in italics indicates the additions made by reissue.

BACKGROUND OF THE INVENTION

The invention pertains to supporting an outboard motor when it is mounted to a boat and placed in an up position. More particularly, it pertains to an outboard motor support device.

Fishing is one of the most popular recreational activities in North America. There are over 30 million anglers in the United States.

Over the past 25 years, there have been significant advances in fishing techniques and equipment. Magazines devoted to fishing in general, and even to specific species of fish have become popular and successful. Television programs about fishing and demonstrating fishing techniques and equipment are seen weekly. Sports and outdoor shows and expositions typically feature seminars by leading professional anglers; and video tapes demonstrating fishing techniques are proved to be popular.

Professional tournament fishing has steadily grown in popularity over the past two decades. Professional bass tournaments featuring large purses are conducted throughout the United States and are the subject of regular television programs. More recently, professional walleye tournaments have seen a similar rise in popularity.

Tournament fishing has led to many improvements in fishing techniques and technology as the professional anglers are constantly seeking to obtain a winning edge over competitors. In tournament walleye fishing, there has been a continuing trend toward larger boats with larger outboard motors. Where a 16 foot boat with a 40 or 50 horsepower tiller-controlled outboard motor was commonplace 10 years ago, tournament walleye fishing boats now are typically about 18 to 20 feet in length with an outboard motor in the range of 150 to 225 horsepower. These large boats and motors are needed to travel long distances on large bodies of water, since most professional walleye tournaments plays on large bodies of water in the Northern United States or Canada, such as the Great Lakes, the Mississippi River, the Missouri River, Lake Winnebago in Wisconsin, and Mille Lacs and Lake of the Woods in Minnesota.

A tournament walleye fishing boat is typically equipped with two other motors in addition to the main outboard motor: a bow mounted electric trolling motor and an auxiliary or "kicker" outboard motor mounted on the transom alongside the main outboard.

The electric trolling motor is used for precise boat positioning and movement. The electric trolling motor is quiet, which can be an advantage in shallow water. On the other hand, electric trolling motors have less thrust than either the main outboard or the kicker.

The kicker motor has become popular as trolling has become a widely used and very effective way of catching walleyes. The kicker motor is generally less than 20 horsepower, with 9.9 horsepower being the most common outboard motor used as a kicker. These smaller outboard motors were originally designed for smaller fishing boats, rather than as an auxiliary motor for a much larger boat.

The kicker motor can be used in a forward direction to troll at precise slow speeds (typically less than 3 miles per hour and in some cases less than 1 mile per hour). The kicker motor can also be used to "back troll", a technique in which the kicker motor is driven in reverse. This results in the boat moving very slowly in a reverse direction, or simply holding its place against current or waves in order to allow the angler to maintain a position over a particular underwater structure.

The increasing use of kicker motors, however, has lead to problems. When the boat is being driven at high speed from one location to another, the kicker motor must be tilted in its up position so that the lower unit of the kicker motor is out of the water. This avoids damage to the kicker motor, and also prevents the associated drag which would otherwise occur. However, when the boat is traveling at higher speeds, the pounding and bouncing of the boat across the water creates a stress on the bracket of the kicker motor, which can cause the bracket to break. This is especially true when the boat is running through swells. As the boat comes down hard from the top of a swell, the kicker motor's lower unit is snapped up pointing almost straight out from the transom of the boat. Then, when the boat bottoms out, the lower unit smashes down placing an extraordinary amount of force or stress on the bracket. These forces and stresses have been known to break the bracket which secures the kicker motor to the transom, and in some cases they have even broken a portion of the transom off of the boat where the bracket of the kicker is secured.

Designers have attempted to re-engineer the bracket to increase its strength. However, these efforts have been unsuccessful in overcoming the stresses associated with boats running through swells. Thus, there exists no known device to adequately support and secure a kicker motor in an up position while traveling over water at higher speeds.

SUMMARY OF THE INVENTION

The invention is a device and method to support and secure an outboard motor to a transom of a boat. The device comprises a tie down bracket, a support and a tie down strap. The tie down bracket is secured to the transom of the boat while the support is rotatably mounted to the motor. The support is mounted such that when the motor is in an up position the support can rotate about its mounting point to contact and support the motor. The tie down strap is then passed behind the motor and is secured to the tie down bracket. The motor is then secured in the up position between the support and the tie down strap which displaces a portion of the stress that would otherwise be placed on the mounting bracket of the motor and prevents the generation of forces or stresses by preventing movement of the motor while the boat is traveling at higher speeds or through semi-rough water from another power source.

DETAILED DESCRIPTION OF THE PREFERRED EMBODIMENTS

Figure 1:
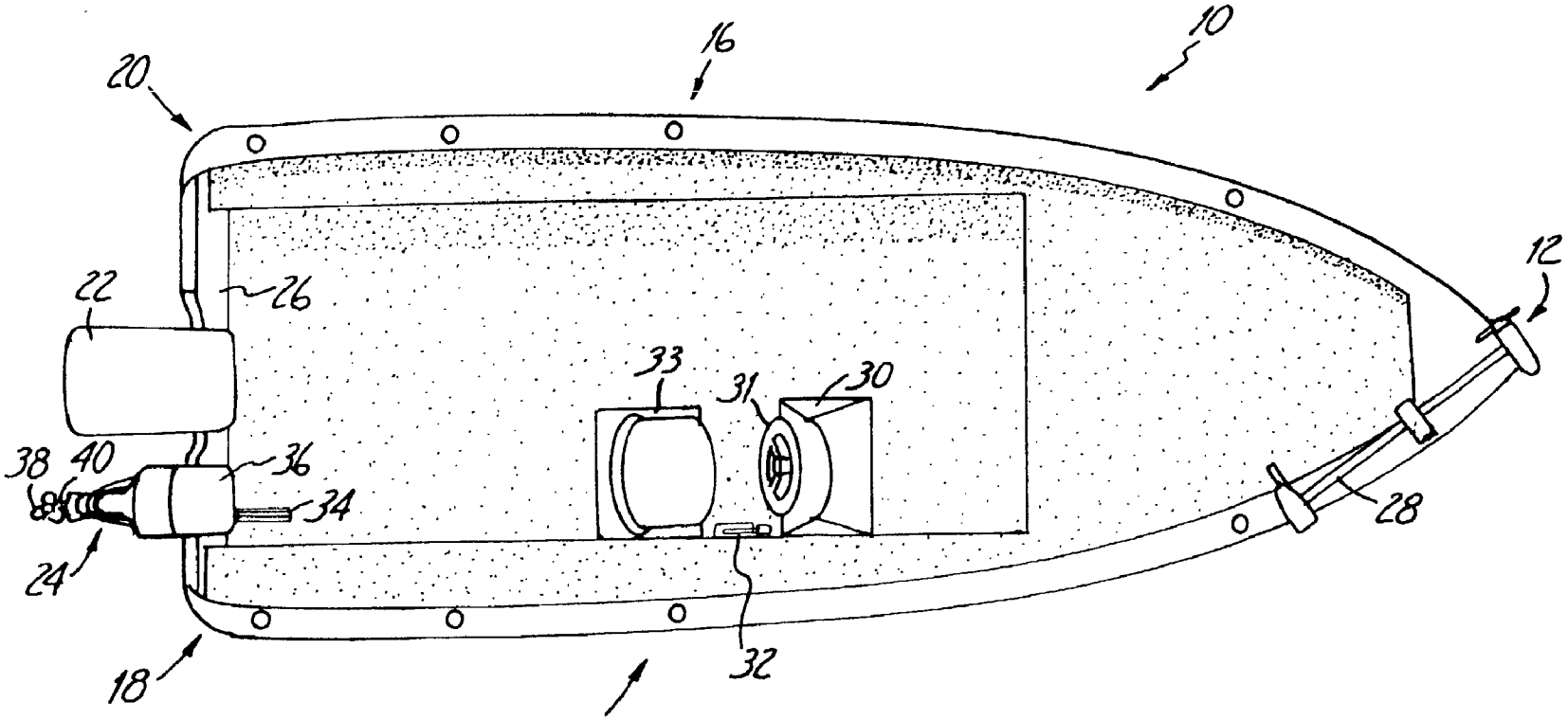
FIG. 1 is a top view of a boat utilizing an outboard motor support device to secure and support an auxiliary motor.

In FIG. 1, a top view of boat 10 is shown. Boat 10 has a bow 12, a starboard side 14, a port side 16, a starboard quarter 18 and a port quarter 20. The boat 10 is powered by main outboard motor 22 and includes auxiliary outboard or "kicker" motor 24. The main outboard motor 22 and the kicker motor 24 are secured to a transom 26 of the boat 10. Electric trolling motor 28 is mounted on bow 12.

In a preferred embodiment, boat 10 includes a console 30, steering wheel 31, throttle control 32, and seat 33. Steering wheel 31 and throttle control 32 control the operation of main outboard motor 22 and may control the operation of kicker motor 24 as well. However, if kicker motor 24 is not controlled from console 30, then tiller 34 on the kicker motor 24 controls its operation.

Main outboard motor 22 provides the power when the boat 10 must travel at high rates of speed. This enables the boat 10 to travel long distances across a body of water very quickly. However, the lowest speed produced by the main outboard motor 22 can be faster than what is needed for trolling.

Trolling typically requires speed of less than three miles per hour and often involves speeds of one mile per hour or less. In some situations, "back trolling" (driving boat 10 in reverse) is used to achieve even slower trolling speeds or to hold the boat 10 in a precise location against a current or the wind. Both bow-mounted electric trolling motor 28 and transom-mounted kicker motor 24 provide options for trolling and precision boat control.

Main outboard motor 22 is secured to the center of the transom 26 to maximize the aerodynamics and balance of boat 10 while traveling at higher speeds. This maximizes the fuel efficiency of outboard motor 22 as well as the speed and control of the boat 10. Because kicker motor 24 is used for precise slow speed control, it is not as important that the aerodynamics of boat 10 are maximized when kicker motor 24 is powering boat 10. Kicker motor 24 is therefore mounted to transom 26 along side main outboard motor 22.

When main outboard motor 22 is used to power the boat 10, kicker motor 24 most be placed in an up position. Kicker motor 24 is put in an up position by tilting cowling 36 of the kicker motor 24 forward, causing propeller 38 and skeg 40 to raise out of the water. Kicker motor 24 is raised to an up position during operation of main outboard motor 22 to prevent damage to the auxiliary motor 24 and avoid its interference with the operation of main outboard motor 22. However, with kicker motor 24 in an up position and main outboard motor 22 powering boat 10, the up and down motion of boat 10 creates stresses and forces on the mounting bracket of kicker motor 24 and transom 26 to which it is secured. This is especially the case when boat 10 travels at higher speeds or through rough water or swells. To avoid generating these forces and stresses, outboard motor support device 50 of the present invention is used to support and secure kicker motor 24 in an up position.

Figure 2:
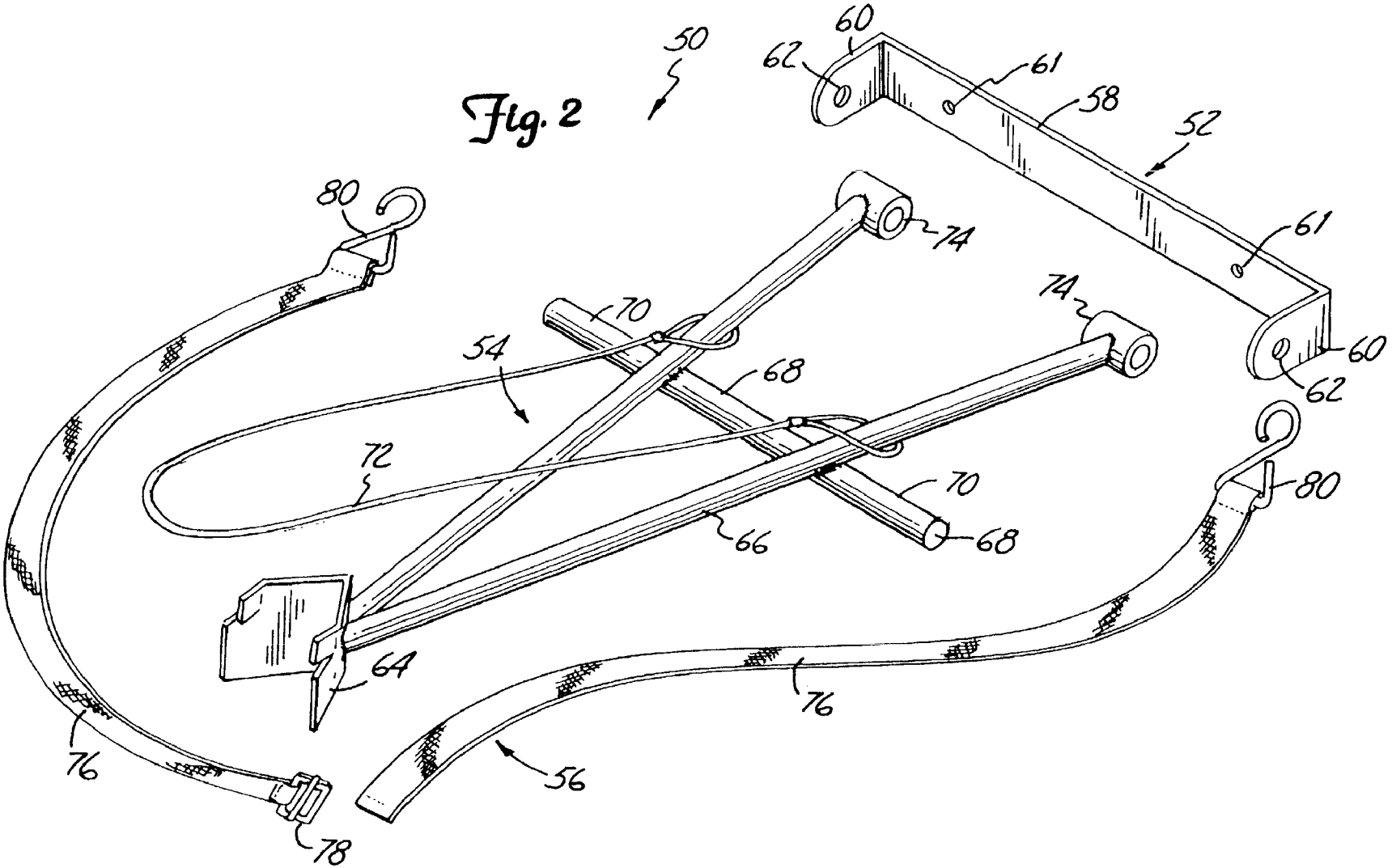
FIG. 2 is a fragmentary view of a preferred embodiment of the invention.

In FIG. 2, a preferred embodiment of the components comprising outboard motor support device 50 are shown. Outboard motor support device 50 includes a tie down bracket 52 (which is mounted to the transom 26), support 54 (which is rotatably mounted to the auxiliary motor 24), and tie down strap 56 (which passes around the auxiliary motor 24 and is secured to tie down bracket 52 such that kicker motor 24 is supported and secured in an up position between support 54 and tie down strap 56).

In a preferred embodiment, tie down bracket 52 is formed by base plate 58 from which a pair of opposed facing tabs 60 extend. Baseplate 58 includes a pair of mounting holes 61, and tabs 60 include aligned hole 62.

The support 54 includes cradle 64, V-frame 66, cross-bar 68, a pair of handles 70, lanyard 72 and a pair of sleeves 74. Cradle 64 is secured to the apex of V-frame 66. Cross-bar 68 is placed across V-frame 66 to add structural support to support 54. Cross-bar 68 extends beyond V-frame 66 to create handles 70 for support 54, lanyard 72 has loops located at each end that slip over sleeves 74 to secure lanyard 72 to the legs of V-frame 66 between cross-bar 68 and sleeves 74. Sleeves 74 are located at the open end of V-frame 66 and are used for mounting support 54 to kicker motor 24 by receiving a pin or bolt.

Tie down strap 56 includes a pair of belts 76 that are secured to each other at one end by buckle 78 and have hooks 80 at their free ends.

Figure 3:
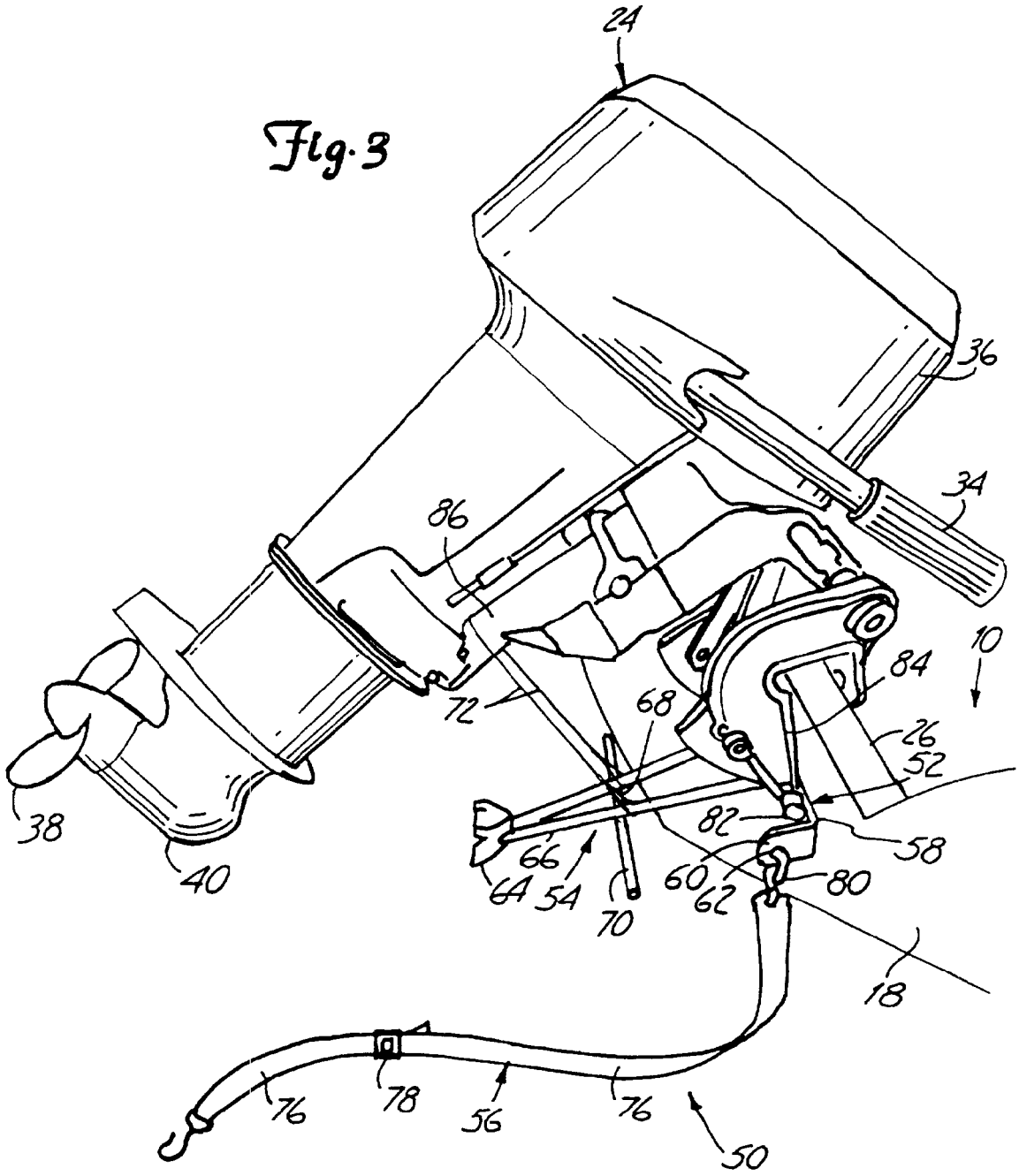
FIG. 3 is a perspective starboard quarter view of a boat using a preferred embodiment of the invention with an outboard motor in an up position.

In FIG. 3, kicker motor 24 is shown mounted to transom 26 at starboard quarter 18 of boat 10. Kicker motor 24 is shown in an up position with cowling 36 tilted forward raising propeller 38 and skeg 40. Outboard motor support device 50 is also shown as it exists prior to supporting and securing the auxiliary motor 24.

In a preferred embodiment, tie down bracket 42 is secured to transom 26 of boat 10. Base plate 58 abuts transom 26 such that the pair of opposed facing tabs 60 extend out from transom 26. Base plate 58 is permanently secured to transom 26 by bolts that pass through mounting holes 61.

Support 54 is pivotally secured by pin 82, which passes through the pair of sleeves 74 to trim adjustment rack 84 of kicker motor 24. Support 54 then hangs from trim adjustment rack 84 and can rotate about pin 82. Lanyard 72 is threaded through drive shaft housing 86 of kicker motor 24 before the ends of lanyard 72 are secured to the legs of V-frame 66. This connects support 54 to kicker motor 24 so that as kicker motor 24 is raised to an up position, lanyard 72 raises support 54 as well. The pair of handles 70 can then be used to raise support 54 to its position of supporting and securing auxiliary motor 24.

When kicker motor 24 is in a down position for operation, support 54 is pivoted down to a position between transom 26 of boat 10 and drive shaft housing 86 of kicker motor 24. The length of support 54 is such that when kicker motor 24 is in a down position, support 54 does not extend into skeg 40 area of kicker motor 24, but is of sufficient length to contact and support drive shaft housing 86 of kicker motor 24 when it is in an up position.

Tie down strap 56 is shown in FIG. 3 with straps 76 secured to each other by buckle 78. The length of tie down strap 56 can be adjusted depending upon where buckle 78 secures straps 76 together. When kicker motor 24 is supported and secured by outboard motor support device 50, tie down strap 56 is secured to tie down bracket 52. Specifically, this is accomplished by hooks 80 being placed in holes 62 of tabs 60.

Figure 4:
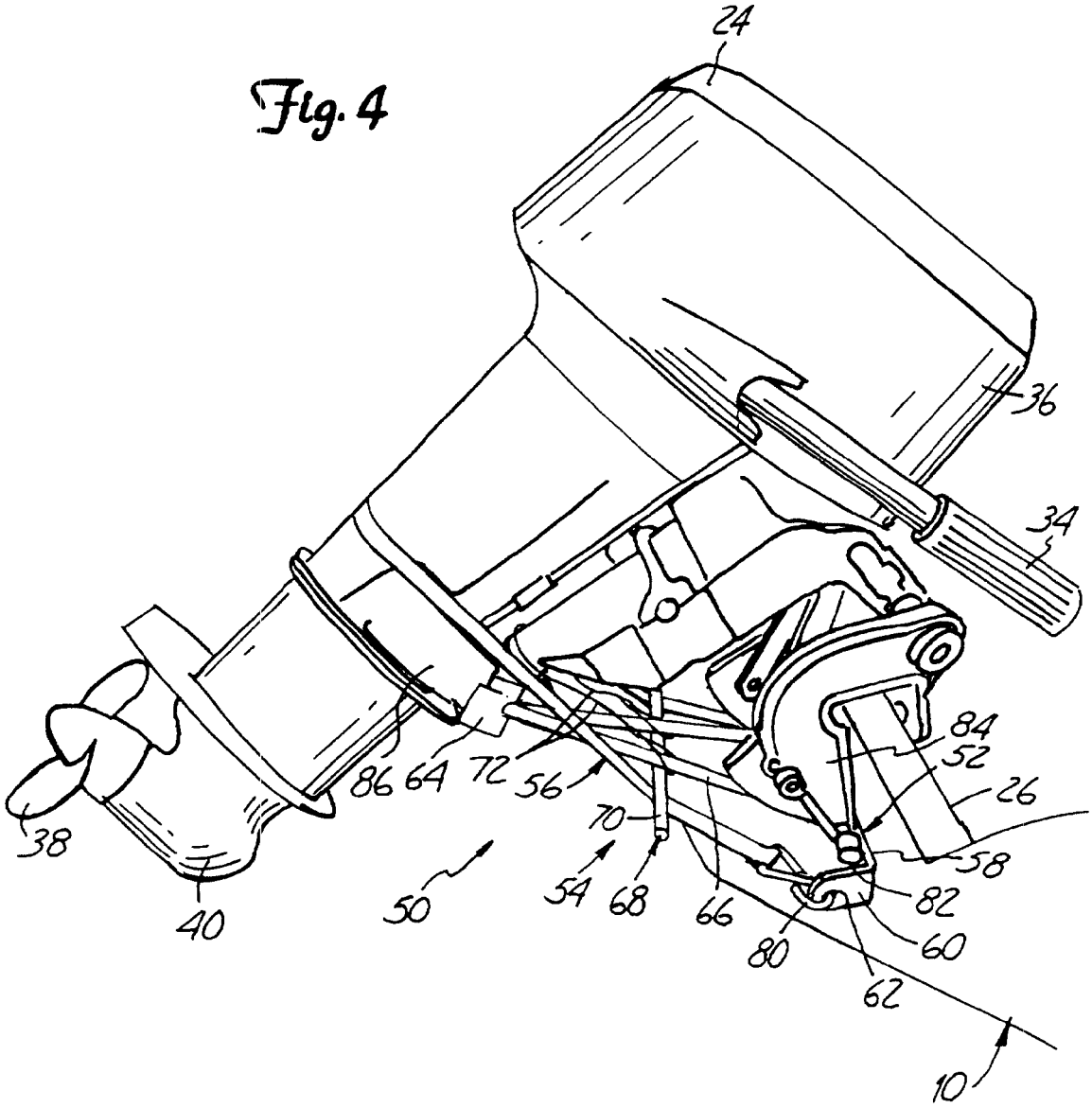
FIG. 4 is a perspective starboard quarter view of a boat having an outboard motor which is supported and secured in the up position by a preferred embodiment of the invention.

In FIG. 4, outboard motor support device 50 is shown supporting and securing kicker motor 24 which is in an up position. To support and secure kicker motor 24, support 54 is upwardly rotated so that cradle 64 receives and contacts drive shaft housing 86 of kicker motor 24. Once support 54 is in place to support and secure kicker motor 24, tie down strap 56 is then passed behind drive shaft housing 86 and is secured on both sides of kicker motor 24 to tie down bracket 52. Again, tie down strap 56 is secured to tie down bracket 52 by hooks 80 passing through holes 62 of the pair of tabs 60. With tie down strap 56 secured to tie down bracket 52, the length of tie down strap 56 is then adjusted to secure kicker motor 24 between cradle 64 of support 54 and tie down strap 56.

In a preferred embodiment, tie down strap 56 passes beneath handles 70 as shown in FIG. 4. This helps cinch kicker motor 24 between tie down strap 56 and cradle 64 and aids in maintaining the proper positioning of support 54 in relation to kicker motor 24.

Outboard motor support device 50 does not allow kicker motor 24 to bounce up and down or tilt further forward and slam down to its up position when boat 10 travels at a high rate of speed or through rough waters or swells. Rather, kicker motor 24 is maintained in an up position which prevents the generation of the stresses and forces associated with kicker motor 24 bouncing up and down and thus avoids damage to either mounting bracket of kicker motor 24 or to transom 26 or boat 10.

Outboard motor support device 50 is simple in construction and easy to install. Most importantly, it is easy and quick to use.

Although the present invention has been described with reference to preferred embodiments, workers skilled in the art will recognize that changes may be made in form and detail without departing from the spirit and scope of the invention. For example, the support could have a different configuration than a V-frame or be mounted to a different location on the motor or the boat. Additionally, the tie down strap could be secured to the tie down bracket with another means, or only one end of the strap could be secured to the tie down bracket with the belt passing through a ring located at the other end of the belt to create a loop within which the motor would be captured.

What is claimed is:

1. An outboard motor support device for securing an outboard motor to a transom of a boat, the device comprising:

a tie down bracket placed between a trim adjustment rack of the motor and the transom of the boat;

a support rotatably mounted with respect to the motor such that when the motor is in an up position the support can rotate about its mounting point to contact and support the motor; and a tie down strap which passes behind the motor and is secured to the tie down bracket.

2. The device of claim 1, wherein the tie down bracket has a base plate which is secured adjacent to the transom by compression directed from the trim adjustment rack toward the transom and a pair of tabs that extend perpendicular to the base plate with the pair of tabs each having a hole.

3. The device of claim 1, wherein the tie down strap is adjustable in length and has a pair of ends that are secured to the tie down bracket on opposite sides of the motor.

4. The [tie down strap] *device* of claim 3, wherein a hook is secured at each end of the tie down strap for securing the tie down strap to the tie down bracket through the holes on the pair of tabs.

5. The device of claim 1, wherein the support has a cradle which receives and secures the drive shaft housing of the motor.

6. The device of claim 5, wherein the support comprises a V-frame with a cross bar such that the opening of the V-frame mounts to the trim adjustment rack of the motor.

7. The device of claim 6, wherein the cross bar extends beyond the V-frame to form a pair of handles on either side of the V-frame.

8. The device of claim 1, wherein a lanyard is connected between the motor and the support to raise the support when the motor is raised to an up position.

9. The device of claim 1, wherein the support is rotatably mounted such that the support is positioned between the motor and the transom when the motor is in a down position.

10. The device of claim 9, and further including:

means connected between the support and the motor for rotating the support upward when the motor is tilted from the down position to the up position.

11. The device of claim 10, wherein the support includes a handle.

12. The device of claim 1, wherein the tie down bracket has a base plate which is mounted to the transom by bolts which mount the motor to the transom by passing through the trim adjustment rack of the motor and the base plate of the tie down bracket, the tie down bracket also including a pair of tabs that extend perpendicular to the base plate with the pair of tabs each having a hole.

13. An outboard motor support device for securing an outboard motor to a transom of a boat, the device comprising:

a tie down bracket having a base which is secured to the transom and a first and a second tab which extend from the base opposedly facing each other, wherein the first and the second tabs each have a hole;

a support formed in a V-frame having a cross bar and a cradle, wherein the opening of the V-frame is mounted in relation to the motor such that when the motor is in an up position the support can rotate about its mounting point and the cradle located at the apex of the V-frame receives and supports the motor along the drive shaft housing of the motor; and a tie down strap of adjustable length having a pair of hooks secured to its ends, wherein one of the hooks is secured in each one of the holes in the tabs and the tie down strap passes behind the drive shaft housing of the motor.

14. The device of claim 13, wherein the cross bar extends beyond the V-frame to form a pair of handles for the support on either side of the V-frame.

15. The device of claim 14, wherein the tie down strap passes beneath the handles of the support.

16. The device of claim 13, wherein a lanyard cable is connected between the motor and the support to raise the support when the motor is tilted to an up position.

17. A method for securing a motor to a transom of a boat, the method comprising:

sliding a tie down bracket of an outboard motor support device between a transom of the boat and a trim adjustment rack of the motor;

mounting the motor to the transom of the boat which compresses and secures the tie down bracket between the trim adjustment rack of the motor and the transom of the boat;

tilting the motor to an up position;

rotating a support of the motor support device which has a frame pivotally mounted with respect to the motor and which has a cradle, such that the cradle receives and supports the motor along a drive shaft housing of the motor; and securing a tie down strap of the motor support device to the tie down bracket such that the tie down strap passes behind the drive shaft housing of the motor and secures the motor in place between the cradle of the support and the tie down strap.

18. An outboard motor support device for securing an outboard motor to a transom of a boat, the device comprising:

a tie down bracket;

a support having a V-frame with a cradle at its apex which is rotatably mounted with respect to the motor such that when the motor is in an up position the support can rotate about its mounting point to contact and support the motor in the cradle; and a tie down strap which passes behind the motor and is secured to the tie down bracket.

19. The device of claim 18, wherein the tie down bracket has a base plate which is secured between the transom of the boat and a trim adjustment rack of the motor, the tie down bracket further including a pair of tabs that extend perpendicular to the base plate with the pair of tabs each having a hole.

20. The device of claim 18, wherein the tie down strap is adjustable in length and has a pair of ends that are secured to the tie down bracket on opposite sides of the motor.

21. The [tie down strap] *device* of claim 20, wherein a hook is secured at each end of the tie down strap for securing the tie down strap to the tie down bracket.

22. The device of claim 18, wherein the cradle receives and secures the motor along a drive shaft housing of the motor.

23. The device of claim 22, wherein the V-frame opening of the support mounts to a trim adjustment rack of the motor.

24. The device of claim 22, wherein the V-frame has a cross bar which extends beyond the V-frame to form a pair of handles on either side of the V-frame.

25. The device of claim 18, wherein a lanyard is connected between the motor and the support to raise the support when the motor is raised to an up position.

26. The device of claim 18, wherein the support is rotatably mounted such that the support is positioned between the motor and the transom when the motor is in a down position and the [axis] *plane* of rotation for the support is along a plane parallel to the length of the boat.

27. The device of claim 26, and further including:

means connected between the support and the motor for rotating the support upward when the motor is tilted from the down position to the up position.

28. The device of claim 27 wherein the support includes a handle.

*29. An outboard motor support device for securing an outboard motor to a transom of a boat, the device comprising:*

*a tie down bracket;*

*a v-shape support with a cradle at an upper end and having a lower end rotatably mounted with respect to the motor at a position above a bottom edge of the transom such that when the motor is in an up position the support can rotate about its mounting point to contact and support the motor and when the motor is in a down position the support is positioned between the motor and the transom; and*

*a tie down element which passes behind the motor and is secured to the tie down bracket when the motor is in the up position to hold the motor in contact with the support.*

*30. The device of claim 29 wherein a hook is secured at each end of the tie down element for securing the tie down element to the tie down bracket through holes at opposite ends of the tie down bracket.*

*31. The device of claim 29 wherein the support has a cradle which receives and secures a drive shaft housing of the motor.*

*32. The device of claim 31 wherein the support has an first end and a second end, wherein the cradle is located at the first end, and wherein the support is rotatably mounted at its second end.*

*33. The device of claim 29, and further including:*

*means connected between the support and the motor for rotating the support upward when the motor is tilted from the down position to the up position.*

*34. An outboard motor support device for securing an outboard motor to a transom of a boat, the device comprising:*

*a rigid tie down member;*

*a v-shape support with a cradle at an upper end and having a lower end rotatably mounted about a horizontal pivot axis which is generally parallel to the transom and located above a bottom edge of the transom such that when the motor is in an up position the support can rotate about the pivot axis to contact and support the motor in the cradle and when the motor is in a down position the support is positioned between the motor and the transom; and*

*a flexible tie down element connectable to opposite ends of the tie down member which passes behind the motor to hold the motor in contact with the cradle when the motor is in its up position.*

*35. The device of claim 34 wherein the cradle receives and secures the motor along a drive shaft housing of the motor.*

*36. The device of claim 34 wherein a lanyard is connected between the motor and the support to move the support to a position for contacting and supporting the motor when the motor is raised to an up position.*

*37. An outboard motor support device for securing an outboard motor to a transom of a boat, the device comprising:*

*a tie down bracket having holes at opposite ends;*

*a v-shape support having a cradle at an upper end, wherein a lower end of the support is mounted for pivotal movement about an axis located above a bottom edge of the transom such that when the motor is in an up position the support can rotate about its mounting point to a first position at which the cradle receives and supports the motor along a drive shaft housing of the motor and when the motor is in a down position the support is in second position between the motor and the transom; and*

*a tie down element having a pair of hooks secured to its ends, wherein each one of the hooks is secured in one of the holes in the tie down bracket and the tie down element passes behind the drive shaft housing of the motor to hold the drive shaft housing in contact with the cradle when the motor is in the up position.*

*38. The device of claim 37 wherein a lanyard is connected between the motor and the support to pivot the support when the motor is tilted to an up position.*

*39. An outboard motor support device for securing an outboard motor to a transom of a boat, the device comprising:*

*a rigid tie down member;*

*a v-shape support rotatably mounted at a lower end and having a cradle at an upper end, the support being rotatable about a pivotal axis located above a bottom edge of the transom so that when the motor is in an up position the support can rotate about its lower end so that the cradle receives and supports the motor along a drive shaft housing of the motor and when the motor is in a down position the support is positioned between the motor and the transom; and*

*a flexible tie down element connectable to the rigid tie down member, which passes behind the motor for*

*securing the drive shaft housing in place against the cradle when the motor is in an up position.*

*40. An outboard motor support device for securing an outboard motor to a transom of a boat, the device comprising:*

*a rigid tie down member;*

*a v-shape support rotatably mounted at a lower end and having a cradle at an upper end, the support being rotatable about a pivotal axis located above a bottom edge of the transom so that when the motor is in an up position the support can rotate about its lower end so that the cradle receives and supports the motor along a drive shaft housing of the motor and when the motor is in a down position the support is positioned between the motor and the transom;*

*a flexible tie down element connectable to the rigid tie down member, which passes behind the motor for securing the drive shaft housing in place against the cradle when the motor is in an up position; and*

*means connected between the support and the motor for rotating the support upward when the motor is tilted from the down position to the up position.*

* * * * *